Jan. 9, 1923.

R. V. LEE.
FAUCET.
FILED SEPT. 7, 1920.

1,441,987.

INVENTOR.
Richard V. Lee
BY
Watson E. Coleman
ATTORNEY.

Patented Jan. 9, 1923.

1,441,987

UNITED STATES PATENT OFFICE.

RICHARD V. LEE, OF CALISTOGA, CALIFORNIA, ASSIGNOR OF ONE-HALF TO THOMAS M. McGRAIL, OF CALISTOGA, CALIFORNIA.

FAUCET.

Application filed September 7, 1920. Serial No. 408,661.

To all whom it may concern:

Be it known that RICHARD V. LEE, a citizen of the United States, residing at Calistoga, in the county of Napa and State of California, has invented certain new and useful Improvements in Faucets, of which the following is a specification, reference being had to the accompanying drawings.

This invention relates to faucets and has for its object to provide a faucet wherein the valve may be repaired without the services of skilled labor.

Another object is to provide a faucet of this character wherein the handle and valve may be removed to repair a leak in the valve without shutting off the water in the main supply pipe.

Another object is to provide a faucet of this character including two valves, each valve simultaneously permitting the discharge of liquid from the faucet, one of said valves automatically shutting off the liquid when the other valve is removed for repairs.

A still further object of the invention is to provide a faucet of this character including a valve having a valve stem, the end of said valve stem being provided with a handle, said handle being secured to the valve by means of a screw, the screw carrying a plurality of repair washers, the washers cooperating with the screw to form a continuation of the handle.

A still further object of the invention is to provide a faucet of this character having a threaded cap for holding the valve within the valve casing, said cap having a handle whereby the same may be removed without the use of a wrench.

With the above and other objects in view, the invention consists in the improved construction and arrangement of parts to be hereinafter more particularly described, fully claimed and illustrated in the accompanying drawings, in which:—

Figure 1:
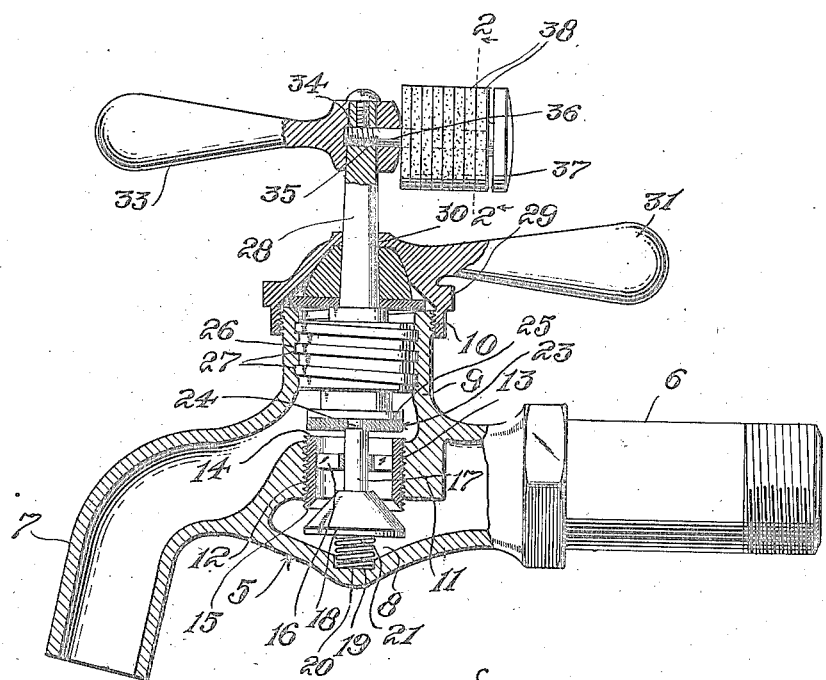
Figure 2:
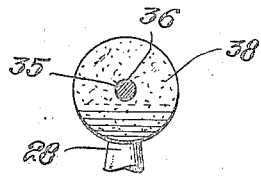

Figure 1 is a view partly in side elevation and partly in section of a faucet constructed in accordance with an embodiment of my invention, and Figure 2 is a fragmentary sectional view taken substantially on the line 2—2 of Figure 1.

Referring to the drawings, 5 designates a faucet having an inlet member 6 and an outlet member 7, a valve chamber 8 being formed at the junction of the inlet and outlet members. A valve chamber 9 projects from the faucet above the chamber 8, said valve chamber 9 being open at its end and provided with the usual threads 10. A partition 11 separates the inlet and outlet members, said partition having a threaded opening 12.

In order to permit the main valve of the faucet to be removed in order to apply a new washer without shutting off the water, I provide a novel valve mechanism consisting of a sleeve 13 which is exteriorly threaded and disposed within the opening 12. The sleeve has a valve seat 14 formed at its upper end and a valve seat 15 formed at its lower end. A bearing spider 16 is disposed within the sleeve and is intended to receive the valve stem 17 of a valve 18. It will be noted that the valve stem 17 is longer than the sleeve 13 so as to permit the end of the stem to project beyond the valve seat 14. The valve 18 is arranged to engage the valve seat 15 to close the lower end of the sleeve and prevent passage of water through the outlet member 7. This valve is assisted in its operation by means of a spring 19 which is disposed in a depression 20 formed in the lower wall of the chamber 8, said spring surrounding a lug 21 which projects from the lower face of the valve 18. The spring 19 urges the valve 18 into closed position.

Disposed in the valve chamber 9 is a main valve 23, said valve having a projection 24 adapted to hold a washer 25 in engagement with the valve. The upper portion of the valve is larger than its seat engaging portion and is threaded as at 26 and adapted to engage threads 27 formed in the wall of the valve chamber 9. A valve stem 28 projects from the enlarged portion of the valve and extends beyond the end of the valve chamber 9. A retaining cap 29 is adapted to engage the threads 10 of the chamber 9, said cap including a central opening 30 through which the valve stem 28 projects. This cap is provided with a handle 31 which permits the cap to be readily applied and removed without the use of a wrench or like tool. The end of the valve stem 28 is provided with a threaded opening 32. A handle 33 is mounted on the end of the stem 28, said handle having a threaded opening 34 in one end thereof. A screw 35 is disposed in said openings, the screw including a relatively long shank 36 and a head 37, the head corresponding in diameter to the diameter of a conventional size of washer. It will be noted that the shank 36 is considerably longer than the depth of the opening 34. The purpose of this is to permit a plurality of washers 38 to be positioned on the shank 36 between the head 37 and the end of the handle 33. In this way, when it is necessary to repair a leaking valve the washers are always within reach. At the same time the screw and the washers 38 form a continuation of the handle 33 so that a firm grip may be obtained when operating the faucet.

In use, the lug 24 is adapted to engage the end of the valve stem 17 when the washer 25 is engaged with the valve seat 14 to close the faucet. This causes depression of the valve stem 17 and disengages the valve 18 from the valve seat 15 permitting liquid to pass into the sleeve to the washer 25. When the lever 33 is turned to permit the discharge of liquid, the valve 23 is disengaged from the valve seat 14 and as the lug 24 is still engaged with the valve stem 17, both valves are open so as to permit water to pass through the sleeve and out of the outlet member 7. In this way the valve 18 is normally maintained in an open position regardless of whether the valve 23 is closed or opened.

When it is desired to replace the washer 25 to cure a leak, the cap 29 is disengaged from the threads of the casing my means of the handle 31 whereupon the valve stem 28 may be rotated so as to remove the valve 23 from the chamber 9. This releases the valve stem 17 and permits the spring 19 to expand, thereby forcing the valve 18 into engagement with the valve seat 15 and shutting off the supply of liquid while the main valve 23 is being repaired. The washer 25 may be discarded and one of the washers 38 removed from the shank 36 and disposed in engagement with the valve 23. This operation may be conveniently and quickly performed by an unskilled person as no tools or like repairing means are necessary.

What is claimed is:—

1. A faucet of the character described comprising inlet and outlet members, a casing projecting from the junction of said inlet and outlet members with each other, a valve including a valve stem mounted in said casing, a handle disposed on the end of said stem, said handle having a threaded opening, a screw greater in length than the depth of said opening and having one end disposed in the opening, and a plurality of auxiliary valve washers disposed on the screw between the head thereof and the end of the handle, said screw and washers forming a continuation of the handle.

2. A faucet of the character described comprising a body, a sleeve having a valve seat at each end thereof, a bearing spider disposed in said sleeve, a conical valve for cooperating with one of said seats and having a stem, said stem being slidable through the spider a spring disposed between the end of the valve and the faucet body, a second valve stem and valve mounted in the faucet body, the latter valve adapted to cooperate with the other of said seats said second mentioned valve having a lug adapted to engage the stem of the first mentioned valve to compress the spring and holding the latter valve open, said first mentioned valve being operable independently of the second mentioned valve to close the passage through the faucet upon removal of the second mentioned valve.

In testimony whereof I hereunto affix my signature.

RICHARD V. LEE.